United States Patent [19]

Srivastava

[11] Patent Number: 5,249,275
[45] Date of Patent: Sep. 28, 1993

[54] APPARATUS AND METHOD ENABLING A COMPILED PROGRAM TO EXACTLY RECREATE ITS SOURCE CODE

[75] Inventor: Aditya Srivastava, Richardson, Tex.

[73] Assignee: Texas Instruments Incorporated, Dallas, Tex.

[21] Appl. No.: 696,265

[22] Filed: Apr. 30, 1991

Related U.S. Application Data

[63] Continuation of Ser. No. 316,556, Feb. 27, 1989, abandoned, which is a continuation of Ser. No. 191,857, May 4, 1988, abandoned, which is a continuation of Ser. No. 854,221, Apr. 21, 1986, abandoned.

[51] Int. Cl.$^5$ .................................... G06F 9/45
[52] U.S. Cl. ..................... 395/375; 364/DIG. 1; 364/280.4
[58] Field of Search .............. 395/375, 500, 700; 371/19; 364/DIG. 1, DIG. 2

[56] References Cited

U.S. PATENT DOCUMENTS

| | | | |
|---|---|---|---|
| 4,099,230 | 7/1978 | Mead | 364/200 |
| 4,149,243 | 4/1979 | Wallis | 364/200 |
| 4,389,706 | 6/1983 | Gomola et al. | 364/200 |
| 4,398,249 | 8/1983 | Pardo et al. | 364/300 |
| 4,456,958 | 6/1984 | De Santis et al. | 364/200 |
| 4,466,061 | 8/1984 | De Santis et al. | 364/200 |
| 4,468,736 | 8/1984 | DeSantis et al. | 364/300 |
| 4,533,997 | 8/1985 | Furgerson | 364/200 |
| 4,558,413 | 12/1985 | Schmidt et al. | 364/200 |
| 4,694,420 | 9/1987 | Pettet et al. | 364/900 |

OTHER PUBLICATIONS

Warren, D.H.D. "An Abstract Prolog Instruction Set." Technical Note 309 (Oct. 1983), pp. 1-30.
T. E. Hintz and C. S. Minshall, *Design of an Incremental Compiler and Interactive Interpreter Utilizing a Hybrid Token-Threaded Code*, IBM Technical Disclosure Bulletin, 1984, vol. 26 No. 101, pp. 5301 and 5302.

*Primary Examiner*—Robert B. Harrell
*Attorney, Agent, or Firm*—W. Daniel Swayze, Jr.; Leo N. Heiting; Richard L. Donaldson

[57] ABSTRACT

A computer system capable of compiling PROLOG programs appends to the compiled code information necessary to recreate the source which generated the compiled code. This allows program statements which use the original source code to be compiled. Each program statement is compiled into a separate block of code, with all statements in a procedure linked together in lists. Program statements can be compiled as they are created, and statements can be added or deleted by adding or deleting blocks of compiled code from the appropriate lists.

19 Claims, 2 Drawing Sheets

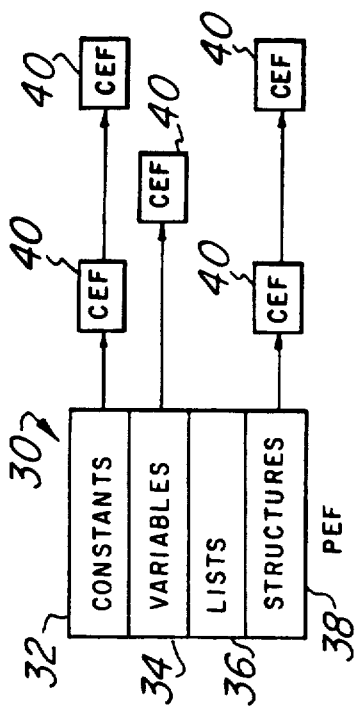
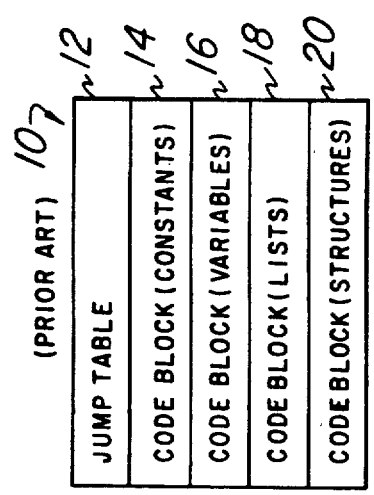
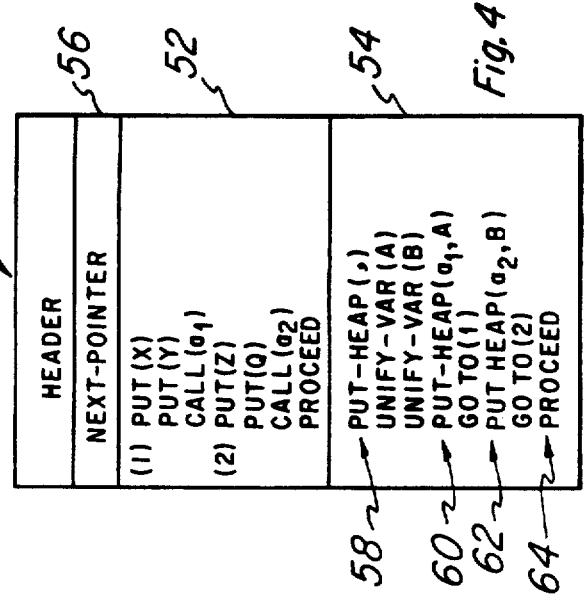
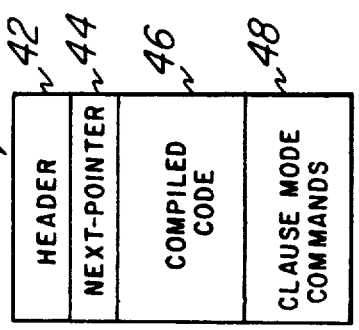

APPARATUS AND METHOD ENABLING A COMPILED PROGRAM TO EXACTLY RECREATE ITS SOURCE CODE

This application is a continuation of application Ser. No. 07/316,556, filed Feb. 27, 1989, which is a continuation of Ser. No. 07/191,857, filed May 4, 1988, which is a continuation of Ser. No. 07/854,221, filed Apr. 21, 1986, all now abandoned.

BACKGROUND OF THE INVENTION

The present invention relates generally to computer systems and more specifically to a system having the capability for re-creating source code from object code.

Computer languages which compile into a machine language which is native to a computer system are known to execute much faster than interpreted languages. In this context, the term interpreted languages means those languages which are translated from a source form into machine language at execution time while a compiled language is one which is translated to machine language during a previous, compilation step.

Compilers exist for many languages currently in popular use. However, there exist languages which currently cannot be fully compiled into machine language. A typical language of this class of languages is the programming language PROLOG, which is commonly in use in artificial intelligence research. Current PROLOG systems can be partially compiled, but certain desirable features of the language cannot be. Thus, a typical PROLOG compiler will compile a portion of the source code into machine language, and leave the remaining source code untouched to be translated to machine language by an interpreter at execution time.

Those portions of the language which have not heretofore been compilable relate generally to the self-modification commands within PROLOG. These include the CLAUSE, ASSERT, and the RETRACT commands. As is well known to PROLOG programmers, the CLAUSE command is used when one wishes to copy a portion of the original source code into a data structure for further manipulation by the program. This data structure may be modified, and then executed as a program block. The ASSERT and RETRACT commands, respectively, are used to add and delete clauses within the program at execution time. Those parts of the source code which are expected to used be by these commands must currently be retained in source form and executed by an interpreter at execution time. This greatly slows overall operation of the program.

SUMMARY OF THE INVENTION

It would be desirable for a compiler for languages such as PROLOG to fully compile the language, leaving no portions to be executed by an interpreter at execution time. It is therefore an object of the present invention to provide a system usable in a programming environment for languages such as PROLOG which allows full compilation of statements such as CLAUSE, ASSERT and RETRACT.

Therefore, in accordance with the present invention, a system for compiling and writing programs in a language such as PROLOG compiles individual statements into separate blocks. Related blocks which define procedures are linked together as lists. The system which executes the compiled program is modified to recognize a new operating mode, referred to herein as the clause mode. The individually compiled statement blocks include a section of compiled code which is executed in a standard manner, and a section containing commands which are executed when the system operates in the clause mode. The clause mode commands appended to each compiled block allow the source code which created that block to be recreated at execution time.

The novel features which characterize the present invention are defined by the appended claims. The foregoing and other objects and advantages of the present invention will hereafter appear, and for purposes of illustration, but not of limitation, a preferred embodiment is shown in the accompanying drawings.

BRIEF DESCRIPTION OF THE DRAWINGS

FIG. 1 shows a compiled code block for a procedure according to the prior art;

FIG. 2 shows a procedure execution frame and its relationship to clause execution frames according to the present inventions;

FIG. 3 shows the construction of a single clause execution frame;

FIG. 4 shows the actual contents of a sample clause execution frame;

DESCRIPTION OF THE PREFERRED EMBODIMENTS

Figure 5:
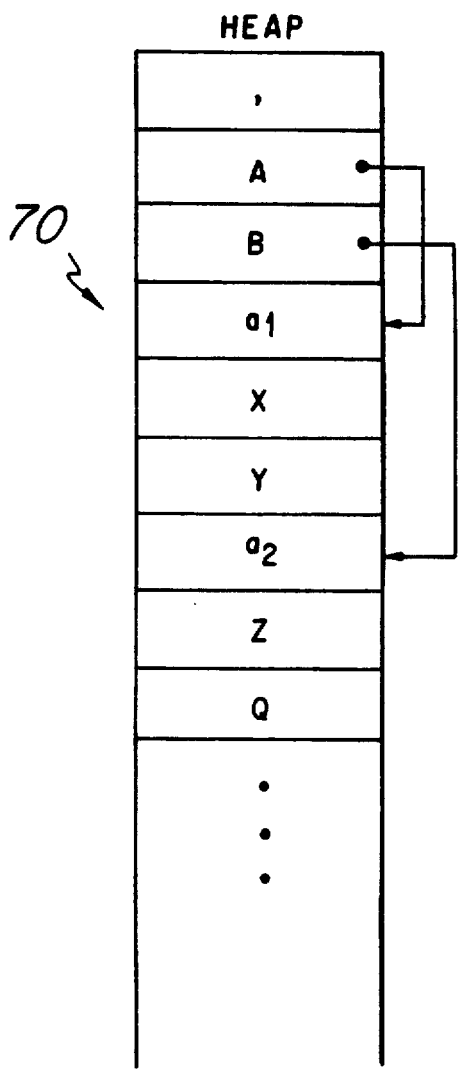
FIG. 5 shows a heap and data created thereon by executing the clause execution frame of FIG. 4.

The present invention will be described as relates to an implementation of the logic programming language PROLOG. As will become apparent to those skilled in the art, the invention can be extended to and includes its use to related languages such as PARLOG and Concurrent PROLOG. The invention also has applicability to computer systems generally.

A PROLOG program can be considered as a series of clauses which state relationships between various items, each of which may also be clauses or simple factual statements. A group of clauses making up a portion of a PROLOG program is shown in Table I.

TABLE I a(1):- a1(X,Y), a2(Q,Z)
a(2):- a2(X,Z), b2(2)
a(X):- a2(1,Y), b2(Z)
a(X):- a1(g(X),3), b3, g2(4)
b2 :- C3(X), C2(2)
b2 :- g(4)
b2 :- g(X), g1(X,Y),g2(X)
a1(1,1) :- g(2), g2(2)
a1(1,2) :- C2(X),g(1)
a1(2,X) :- b3, b4

No particular meaning is intended to be associated with the clauses shown in Table I. The first four clauses can be considered to be a single procedure. Taken together, they determine the truth of the assertion a, which has a single argument. The next three clauses are considered to be a procedure which determines the truth of the assertion b2 and the last three determine the truth of the assertion a1, which has two arguments. The remaining clauses used in Table I are assumed to be defined elsewhere.

The first two clauses in the procedure for a have arguments which are constants, while the last two have arguments which are variables. These two types of clauses will generally execute under different circumstances, and it is convenient to group them separately during compilation in order to improve execution speed.

FIG. 1 shows a segment of compiled code 10 which corresponds to a PROLOG procedure, for example procedure a of Table I. The first item in the procedure is a jump table 12 which is consulted upon entering the procedure. The jump table 12 contains address locations for the beginning of different execution code blocks. These code blocks contain the compiled code for the procedure. As described above, different portions of the procedure are entered depending upon the type of argument passed into it. If a constant or variable is passed to the procedure as described above in connection with Table I, the corresponding code block for constants 14 or variables 16 is jumped to and executed. The argument passed to a procedure can also be a list or a structure, which types were not shown in Table I, and arguments of these types cause execution of the procedure to be transferred to the corresponding lists 18 or structures 20 code blocks.

The compiled procedure code does not contain information sufficient to recreate the source code from which it was generated. Thus, this type of compilation procedure cannot be used to compile clauses which will be used by a CLAUSE command. The CLAUSE command has the syntax CLAUSE(head, body), where head is the procedure identifier, and body is a value to be matched. Clauses which match the current value of body will be formed into a data structure, which is returned by CLAUSE. The matching is done at the source code level, and source code of the matching clauses is used to form the data structure.

The RETRACT command has the syntax RETRACT(head, body), where head is the procedure identifier, and body is a value to be matched. As in the CLAUSE command, the matching is done of source code. Clauses which match body must be removed from procedure head at execution time. Since the source code cannot be matched, RETRACT cannot be implemented by prior art compilation schemes.

Assert has the syntax ASSERT (clause), where clause will be inserted into the appropriate procedure. There is no extra room left in the various code blocks 14, 16, 18, 20, so that the ASSERT command cannot be used to add additional compiled clauses to the procedure at execution time.

A system which allows the CLAUSE, ASSERT and RETRACT commands to be compiled is illustrated in FIG. 2. Instead of compiling a procedure into separate code blocks and a jump table, a procedure is compiled into a procedure execution frame 30 (PEF). The PEF consists of four pointers 32, 34, 36, 38, each pointer corresponding to one of the argument types which can be passed to the procedure. Thus, the four pointers correspond to parameters which are constants, variables, lists and structures. Each pointer is the head of a linked list.

Each clause is compiled separately into a clause execution frame 40 (CEF). The details of the CEF will be shown in FIG. 3, but each CEF contains compiled code corresponding to a separate clause. All of the CEF's for each argument type are coupled together into a linked list as shown.

When a procedure is called, the computer system determines the type of the argument. The correct pointer is selected based upon that argument type, and the individual CEF's in the corresponding linked list are executed until either a true value is returned or the end of the list is reached. In some ways, the PEF 30 functions in a manner similar to the jump table 12 of FIG. 1. The procedure a of Table I would have two CEF's in the list pointed to by the constants pointer 32, and two CEF's in the list pointed to by the variables pointer 34. The lists and structures pointers 36, 38 would not point to any list, and would typically contain a standard empty pointer known as NIL.

Many systems will contain features to further restrict the number of clauses, CEFs in the preferred embodiment, which are executed during a procedure call. Because PROLOG operates by executing all relevant clauses within a procedure, the performance of large systems degrades considerably unless steps are taken to minimize the number of clauses which are relevant. One typical method is known as indexing, which involves the use of hash tables. A separate hash table is kept for each pointer in the PEF. Once the argument type has been determined (i.e., constant, structure, etc.), the first one or two arguments are hashed and a hash table (not shown) is consulted in a known manner. This table will point to one of a set of linked CEFs, and these are the only ones that must be executed to execute the procedure. Thus, there are a larger number of shorter lists of CEFs, rather than only four longer lists. It will be appreciated that, in the general case, a shorter list will be executed to completion faster than a longer list.

Thus, the pointers 32, 34, 36, 38 in the PEF can point to structures other than simple linked lists. Any structure interconnected by pointers may be used.

Figure 6:
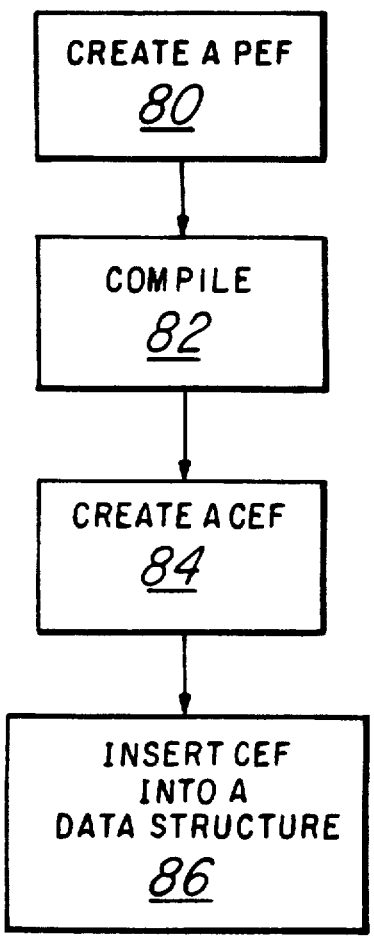
FIG. 6 shows a flow chart of a method according to the present invention for compiling a procedure having a plurality of clauses.

Consider now FIG. 6 which shows a flow chart of a method according to the present invention for compiling a procedure having a plurality of clauses, comprising the steps of: (a) creating a procedure execution frame having a plurality of pointers, each pointer corresponding to a preselected subset of clauses of the procedure having similar characteristics (Block 80); separately compiling each clause into an object code block (Block 82); attaching to each object code block information sufficient to recreate the clause from which that object code block was compiled, to create a clause execution frame (Block 84); and inserting each clause execution frame into a data structure which is pointed to by one of the procedure execution frame pointers (Block 86).

Referring to FIG. 3, detailed construction of the CEF 40 is shown. A header 42 contains typical data required by the system, such as length of the CEF code block 40, data-typing information, and so forth. Next-pointer 42 is the pointer to the next CEF in the list, and will be NIL if a particular CEF is the last element of the linked list. The compiled code portion 46 of the CEF 40 is identical to that code which is compiled into a code block of the compiled procedure 10 shown in FIG. 1. Note that the compiled code blocks 14, 16, 18, 20 of FIG. 1 each contain the compiled code for all clauses of the appropriate type, while the compiled code portion 46 of a CEF contains code for only a single clause. The last segment 48 of the CEF 40 contains clause mode commands, which are those additional commands necessary for recreation of the source code from which that CEF 40 was compiled.

When the system is executing in a normal mode, that is, not in clause mode, the compiled code 46 is executed directly when the CEF 40 is entered. If the compiled code 46 indicates that this particular clause has failed, the system follows the next-pointer 44 to the next CEF on the list and repeats the process.

When the processor is operating in the clause mode, upon entry into the CEF 40 the system executes the first of the clause mode commands 48. Upon exit from the CEF 40, a data structure has been created, usually in the system heap space, which is identical to the source code from which the CEF 40 was originally compiled.

The clause mode commands within the CEF may take any form which is suitable for recreating the source code. For example, the clause mode commands could simply be a copy of the original source code. Upon entering the CEF 40 in clause mode, the source code statements in the clause code commands section 48 would simply be copied to the heap, and the CEF 40 exited.

Such a solution is wasteful of space, inasmuch as there is redundant information contained between the compiled code 46 and the retained source code 48. In the preferred embodiment, special clause mode commands are made available to the processor which uses the information in the compiled code 46 to assist in the recreation of the original source code.

FIG. 4 shows a CEF 50 which corresponds to the first clause of Table I. The clause is recreated as part of FIG. 4 for convenience.

The sequence of events which occurs when the CEF 50 is called in a normal mode will now be described. To determine whether the goal a(1) is true, the two sub-terms a2 (X,Y) and a2 (Q,Z) must be evaluated. The compiled code for doing so is shown in the compiled code portion 52 of the CEF 50. The current values for X and Y are put into argument registers (not shown) from a frame on a local system stack (not shown), and a call made to the procedure a1. If a1 fails, the PROLOG system failure mechanism terminates execution of this CEF, removing the stock frame and following next-pointer 56 if it is not NIL. If as succeeds, then the current values of the variables Z and Q are placed into argument registers and a call made to procedure a2. If a2 succeeds, this clause succeeds and procedure a will return successfully. The clause has succeeded, if execution reaches the proceed command. If a2 fails, a1 will be retried beginning from the point where it left off. This will be the next CEF in the list in a1 after that CEF which last returned successfully.

If there is no pair for which a1 and a2 both succeed, head unification on this clause will fail. If this is the last clause in the list, the procedure a will have failed, and the system failure mechanism will unsuccessfully return from procedure a. This is done by removing from the system stack the most recent frame holding a choice point, which choice-point frame will be pointed to by a backtrack pointer as known in the art. Execution of procedure a is then complete.

If the system is executing instructions in clause mode, upon entry to the CEF 50 control is transferred to the first clause mode command 58. This command 58 puts a conjunction command, shown as a comma in PROLOG, onto the system heap 70 as the beginning of this portion of the data structure to be created there. The system heap 70 built by executing the CEF 50 of FIG. 4 is shown in FIG. 5.

The command Put-Heap(,) is accompanied by a number of unify-var() commands equal to the number of subterms in this clause. Since this clause has 2 subterms a1 and a2, unify-var(A) and unify-var(B) are used to put two pointer positions A and B onto the heap 70. The pointers are initially NIL pointers, but will be later reassigned as described below.

The next clause mode command 60, Put-Heap(a1, A), puts the procedure identifier a1 onto the heap, and changes the value of the pointer A to point to a1, as shown in FIG. 5. Execution then branches to the point labeled (1) in the compiled code portion 52 of the CEF 50. When this branch is made, a location pointer to the next clause mode command 62 is retained. Since the processor is executing in the clause mode, the two commands put(X) and put(Y) put X and Y onto the heap to be included in the data structure, instead of putting them into the argument registers to be executed. The call (a1) statement, instead of executing a procedure call, returns to the location pointer in the clause code commands 54. The next clause mode command 62 is then executed, which puts the procedure identifier a2 onto the heap and changes the value of the pointer B to point to a2. A branch to location (2) is made, and the variables Z and Q are put onto the heap as described above. The call(a2) command transfers control back to the clause mode commands 54.

When execution reaches proceed command 64, the CEF has been completed. The source code for the clause has now been re-created on the heap 70, and can be compared to the body of the CLAUSE or RETRACT command, whichever is operating. If a match is found, procedure a terminates; if not, the heap pointer is reset to delete the data which was put there during execution of this CEF, and the CEF pointed to by next-pointer 56 is executed. Alternatively, the comparison can be made as each item is added to the heap, with the failure mechanism jumping to the next CEF as soon as a difference is detected. Using this method, simply reaching the proceed command 64 indicates that this CEF was successfully matched with the pattern, and successfully returns from the procedure.

If the argument to a goal is a list or structure, rather than a constant or variable, it cannot generally be copied to a single location on the heap as can the variables X, Y, Z and Q. Instead, the list or structure can be created on the heap first, and a pointer to it put onto the heap in a position corresponding to that of X, Y, Z or Q.

TECHNICAL ADVANTAGES

When the source code is compiled into CEFs and PEFs, and the processor is modified to accept the existence of the clause mode, preferably by simply changing a flag setting, the commands CLAUSE, ASSERT and RETRACT are easily compiled for execution.

The CLAUSE command is executed by changing the state of the processor to the clause mode and operating on the appropriate procedures in the manner described in connection with FIGS. 3 and 4.

The ASSERT mode, which adds a clause to a procedure, is easily implemented. When a clause is ASSERTed, it is compiled into a CEF 40 and inserted into the appropriate linked list coming from the appropriate PEF 30.

The RETRACT statement, which deletes clauses which pattern match with its argument, is accomplished almost as easily. Since the pattern match must be made to the source code of the clause, the processor switches into the clause mode and recreates the source code for the clause in each relevant CEF 40. If a pattern match is then found, that CEF 40 is simply deleted from the linked list in a known manner.

The generated code is completely compiled. That is, the clause mode commands as well as the compiled code located in the CEF's are machine language instructions. No source code remains to be interpreted at execution time. This causes the execution speed of the PROLOG program to be much faster than that of prior art systems, which are partially compiled and partially interpreted. Many typical applications will run 5-10 times faster when fully compiled, and applications which operate in the clause mode for any significant portion of their execution time, such as meta-interpreters, can execute up to 100 times faster.

The current invention allows the PROLOG development environment to also be greatly improved over previous systems. In prior art PROLOG systems, a complete source code file must be created, and then compiled in a single step. In actual practice, this usually means that during the early debugging phases of program creation, the code is run completely interpreted. Once the program has been debugged, those portions of it which can be compiled are then compiled. Before compilation, the programmer must carefully delineate which portions of the code are to be compiled and which are to be interpreted. Since PROLOG programs are not deterministic at compile time, there is a high likelihood of mistakes, leading to a run-time crash as the system tries to CLAUSE a segment of compiled code. In addition, it is not unusual for the compiled code to execute differently than the interpreted code, which is clearly not desirable.

The current system allows a PROLOG program to be incrementally compiled as it is created. As each clause is entered, it is compiled into a CEF 40. That CEF 40 is then linked into the appropriate PEF 30. Incomplete programs can be run at any time in order to aid debugging, and such execution is always done on fully compiled code. Thus, the execution time of programs in the development phase is also greatly improved over the prior art.

Since the generated code is completely compiled, efficiency techniques, such as the use of hash tables for indexing described in connection with FIG. 2, can be used in the clause mode as well as in normal mode. This could not be done using the prior art, which runs interpretively in the clause mode.

An important restriction on the use of programs compiled using prior art methods is that the program cannot be changed on the fly (using CLAUSE, RETRACT and ASSERT) unless the programmer has previously determined which portions of the code might be changed, and caused those portions to remain interpreted. This severely restricts the ability of the user to change the data base and rules to fit his particular circumstances, with the result that current applications which require data to be added and modified by the user are generally interpreted. The present invention removes all such restrictions, as all changes can be immediately compiled.

The present invention has been illustrated by the system described above, and it will become apparent to those skilled in the art that various modifications and alterations may be made thereto. Such variations fall within the spirit of the present invention, the scope of which is defined by the appended claims.

What is claimed is:

1. A method enabling a computer to compile source code statements of a programming language, comprising the steps of:
   (a) translating a source code statement into an object code block;
   (b) a compiler of the computer appending to the object code block information sufficient to exactly recreate the source code statement;
   (c) linking the object code block and appended information into a list with object code and appended information for any related source code statements; and
   (d) repeating steps (a) through (c) for each of the source code statements.

2. The method of claim 1, wherein step (c) comprises compiler steps of:
   (c.1) creating a procedure execution frame for each procedure defined by the source code statements, each procedure execution frame have a plurality of pointers, wherein each pointer points to a list of object code blocks having a common property;
   (c.2) determining which procedure execution frame corresponds to the procedure in which the source code statement belongs;
   (c.3) selecting a list of object code blocks pointed to by a pointer in the determined procedure execution frame which have a common property with the source code statement; and
   (c.4) inserting the object code block into the selected list.

3. A method enabling a computer to exactly recreate a source code statement, comprising the steps of:
   (a) compiling the source code statement into an object code block;
   (b) a compiler of the computer appending to the object code block recreation commands, wherein such recreation commands contain information sufficient, when considered in combination with the object code block, to recreate the source code statement; and
   (c) executing the recreation commands and the object code block in a source code recreation mode to recreate the source code statement.

4. A method for compiling a procedure having a plurality of clauses, comprising the compiler steps of:
   (a) creating a procedure execution frame having a plurality of pointers, each pointer corresponding to a preselected subset of clauses of the procedure having similar characteristics;
   (b) separating compiling each clause into an object code block;
   (c) attaching to each object code block information sufficient to exactly recreate the clause from which that object code block was compiled, to create a clause execution frame; and
   (d) inserting each clause execution frame into a data structure which is pointed to by one of the procedure execution frame pointers.

5. The method of claim 4, wherein the data structure is a linked list.

6. The method of claim 4, wherein the procedure execution frame pointers correspond to subsets of clauses which are to be executed depending on which type of argument is passed to the procedure.

7. A method enabling a computer to compile a PROLOG program, comprising the steps of:
   (a) translating source code statements into individual object code blocks;
   (b) a compiler of the computer appending to the object code blocks information sufficient to exactly recreate the source code statements; and (c) linking the object code blocks and appended information into lists with object code blocks and appended information for related source code statements.

8. The method of claim 7, wherein step (c) comprises compiler steps of:
(c.1) creating a procedure execution frame for each procedure defined by the source code statements, each procedure execution frame having a plurality of pointers, wherein each pointer points to a list of object code blocks having a common property;
(c.2) determining which procedure execution frame corresponds to the procedure in which the source code statement belongs;
(c.3) selecting a list of object code blocks pointed to by a pointer in the determined procedure execution frame which have a common property with the source code statement; and
(c.4) inserting the object code block into the selected list.

9. The method of claim 8, wherein the common property of steps (c.1) and (c.3) comprises the type of an argument passed to the procedure.

10. In a computer system for executing programs and having executable memory, the improvement comprising:
a plurality of procedure execution frames having pointers and located within the executable memory; and
a plurality of clause execution frames located within the executable memory and corresponding to said procedure execution frames, wherein each of said clause execution frames, and wherein each of said clause execution frames can be reached by following pointers starting from a procedure execution frame, wherein each of said clause execution frames contains machine executable code, and further wherein each of said clause execution frames contains machine executable code sufficient to enable exact reconstruction of source code from which the machine executable code was derived.

11. The system of claim 10, further comprising a mode of execution within said system for executing source code reconstruction statements and placing a copy of recreated source code into a preselected data structure.

12. A method enabling a computer to compile source code statements of a programming language, comprising the steps of:
(a) translating each source code statement into a block of machine executable instructions;
(b) a compiler of the computer appending to the block of machine executable instructions recreation information, wherein such recreation information is sufficient to recreate the source code statement exactly;
(c) linking each block of machine executable instructions having recreation information appended thereto into a list containing blocks of machine executable instructions and appended recreation information for any related source code statements; and
(d) executing commands indicated by said recreation information and the block of machine executable instructions in a source code recreation mode to recreate the source code statement.

13. The method of claim 12, wherein step (c) comprises:
(c.1) providing a procedure execution frame for each procedure defined by the source code statements, each procedure execution frame having a plurality of pointers, wherein each pointer points to a list of blocks of machine executable instructions having recreation information appended thereto, and wherein the blocks in each list have a selected common property; and
(c.2) inserting each block of machine executable instructions having recreation information appended thereto into a list having the selected common property.

14. A method enabling a computer to compile a PROLOG program, comprising the steps of:
(a) translating each clause into an individual object code block;
(b) a compiler of the computer appending to each object code block information sufficient to exactly recreate the source code statement from which it was translated, wherein the resulting object code block with appended information is referred to as a clause execution frame; and
(c) linking the clause execution frame into lists with clause execution frames of related source code statements.

15. The method of claim 14, wherein step (c) comprises:
(c.1) providing a procedure execution frame for each procedure defined by the source code statements, wherein a procedure is defined as a group of clauses having the same predicate name in the heads of said group of clauses, and each procedure execution frame having a plurality of pointers, wherein each pointer points to a list of clause execution frames which have arguments of the same type in the heads thereof;
(c.2) inserting the clause execution frame into a list with other clauses having the same predicate name and argument types thereas.

16. A method enabling using fully compiled code in source level symbolic debugging and incremental software development of high level languages, comprising the steps of:
(a) compiling each source code statement, said data structure having an object code block and a clause-command block;
(b) during symbolic debugging and incremental software development executing said clause-command block to create a representation exactly matching said source code statement.

17. The method of claim 16, wherein step (a) further comprises the step of writing said clause-command block in machine language.

18. The method of claim 16, wherein step (b) further comprises the step of placing said representation on a heap.

19. The method of claim 16, further comprising the step of:
(c) modifying said source code statement and said corresponding data structure by:
editing said source code statement;
compiling said edited source code into an object code block and a clause-command block; and
entering said object code block and said clause-command block into said corresponding data structure.

* * * * *